United States Patent [19]

Murota et al.

[11] Patent Number: 4,901,488

[45] Date of Patent: Feb. 20, 1990

[54] FIRE/SMOKE PROTECTION STRUCTURE FOR A PLASTIC PIPE OR CABLE CHANNEL PORTION IN A FLOOR OR WALL

[75] Inventors: George Murota, Tokyo; Tadashi Naruse, Yokohama, both of Japan

[73] Assignee: The Furukawa Electric Co., Ltd., Tokyo, Japan

[21] Appl. No.: 269,447

[22] Filed: Nov. 9, 1988

[30] Foreign Application Priority Data

Nov. 12, 1987 [JP] Japan ............... 62-171926[U]
Nov. 12, 1987 [JP] Japan ............... 62-171927[U]

[51] Int. Cl.$^4$ .................................................. E04C 2/00
[52] U.S. Cl. ............................................ 52/232; 52/317
[58] Field of Search ................................... 52/232, 317

[56] References Cited

U.S. PATENT DOCUMENTS

| | | |
|---|---|---|
| 4,093,818 | 6/1978 | Thwaites et al. ............... 52/232 X |
| 4,109,423 | 8/1978 | Perrain ............................. 52/232 X |
| 4,221,092 | 9/1980 | Johnson ............................. 52/232 |
| 4,548,853 | 10/1985 | Bryan ............................. 52/317 X |

FOREIGN PATENT DOCUMENTS

| | | |
|---|---|---|
| 0039587 | 11/1981 | European Pat. Off. . |
| 0160924 | 11/1985 | European Pat. Off. . |
| 0188653 | 7/1986 | European Pat. Off. . |
| 55-65284 | 5/1980 | Japan . |
| 56-55434 | 5/1981 | Japan . |
| 61-14262 | 5/1986 | Japan . |
| WO86/02119 | 4/1986 | PCT Int'l Appl. . |

Primary Examiner—David A. Scherbel
Assistant Examiner—Creighton Smith
Attorney, Agent, or Firm—Frishauf, Holtz, Goodman & Woodward

[57] ABSTRACT

A fire/smoke protection structure for cable channel portion in a floor or wall includes thermal expansion composite molded members each molded into a desired shape and filled in a gap defined between a cable or the like and the channel portion. Each thermal expansion composite molded member is either a member obtained by coating a non-refractory material on the outer surface of a core consisting of a fire retardant resin foaming body compressed to 90% or less of a normal volume, or a member obtained by coating a thermally foaming fire retardant composition on the outer surface of a core consisting of a refractory material and molded into a desired shape. The fire/smoke protection structure can be easily constructed, maintained and reconstructed at a construction site and can be completely and reliably achieved.

10 Claims, 6 Drawing Sheets

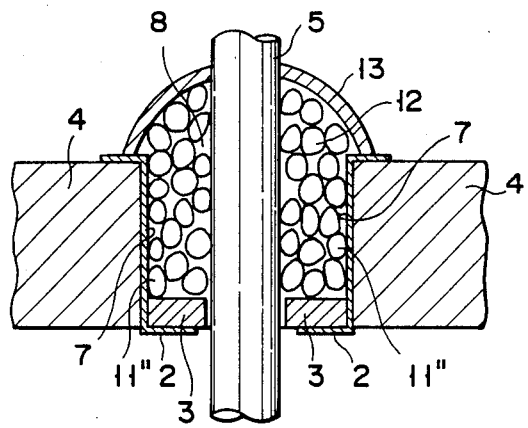
FIG. 11
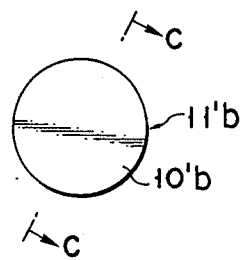
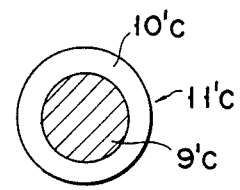
FIG. 12  FIG. 13

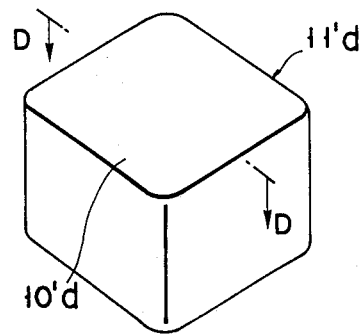
F I G. 14
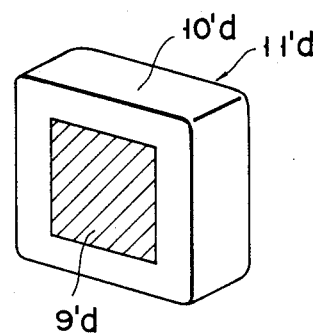
F I G. 15

FIRE/SMOKE PROTECTION STRUCTURE FOR A PLASTIC PIPE OR CABLE CHANNEL PORTION IN A FLOOR OR WALL

BACKGROUND OF THE INVENTION

1. Field of the Invention

The present invention relates to a fire/smoke protection structure for a cable channel portion in a floor, a wall, or the like.

2. Description of the Related Art

A cable or pipe channel portion is formed in a floor or wall constituting a construction such as a building in order to dispose cables for supplying power or plastic pipes for supplying/exhausting water. In particular, a refractory material is filled in a channel portion within an area designated to be a fire partition. That is, if a fire occurs in a fire partition, a channel portion serves as a fire spreading port or flue to increase a damage caused by the fire. Therefore, a refractory material is filled in a channel portion to prevent this. Another reason for filling a refractory material in a channel portion is to prevent cables in the channel portion from being burned and to prevent the channel portion consisting of plastic pipes from being burned.

FIG. 1 is a sectional view showing a conventional fire/smoke protection structure for a cable channel portion in a floor. In FIG. 1, reference numeral 7 denotes a channel portion formed to extend through floor 4. Refractory material receiving metal piece 12 is inserted in channel portion 7 so as to cover the inner wall surface of channel portion 7. Metal piece 12 is fixed to floor 4 by fastening bolts 3. Opening portion 13 through which cables 5 are inserted is formed in metal piece 12. Refractory plate 14 is placed in opening portion 13 of metal piece 12. Cables 5 are inserted in opening portion 13 through plate 14. Plate 14 is formed of, e.g., a ceramic board. Fire retardant resin foaming body, e.g., foaming silicone 15 or the like is filled and foamed in a gap portion defined by metal piece 12, plate 14 and cables 5. An example of the foaming silicone used for this purpose is SEF-1900 (tradename) available from Furukawa Electric Co., Ltd.

In constructing the above conventional fire/smoke protection structure for a cable or pipe channel portion in a floor, filling of foaming silicone 15 at a site of construction presents various problems. That is, a twopart mixing type foaming silicone 15 is generally used. For this reason, substantially equal amounts of two solutions consisting of, e.g., A and B are uniformly mixed within a short time period of 30 to 60 seconds. This mixture must be filled in the above gap portion. In this case, as shown in FIG. 1, the foaming silicone mixture must be filled several times so that filling thicknesses a, b and c after foaming of the filled mixture are set to be 50 mm or less to provide a uniform foaming ratio.

In this case, however, a time for uniformly mixing equal amounts of two solutions A and B is too short. For this reason, a mixed state of the two solutions varies in accordance with a worker. In addition, a mixing time, a foaming time, and a foaming ratio depend on a temperature of two solutions A and B and an ambient temperature. Note that if the mixing time is increased, two solutions A and B are foamed and cured independently of each other in the form of layers a, b and c. This results in a low filling effect. In order to increase the mixing time, a foaming retarder is sometimes mixed in foaming silicone 15. In this case, however, foaming and curing at a low temperature become insufficient. In addition, a cell size in a foamed material is increased. Moreover, a foaming ratio is reduced.

Alternatively, two solutions A and B may be mixed by a mixing machine. However, it is troublesome to carry a mixer to a predetermined place of a building under construction. In addition, it is difficult to carry a mixer to a narrow construction place of a building.

In order to increase the number of cables, a cable channel portion in a floor once constructed is sometimes removed and then reconstructed. In this construction, the above problems are also posed with the above method when foaming silicone is filled.

FIG. 2 is a sectional view showing a conventional fire/smoke protection structure for a plastic pipe channel portion in a floor. In FIG. 2, the same reference numerals as in FIG. 1 denote the same parts. Refractory plate receiving metal piece 12 is inserted in channel portion 7 in floor 4. Refractory plate 14 consisting of a ceramic board is placed in metal piece 12. Plastic pipe 5' is inserted in opening portion 13 of metal piece 12 through plate 14. Mortar-like filler 6 is filled in a gap portion defined by metal piece 12, plate 14 and pipe 5'. Metal piece 12 is made of, e.g., iron. Filler 6 is formed of a refractory member such as gypsum, vermiculite and cement.

In filling filler 6 for constituting the fire/smoke protection structure for a cable channel portion in a floor, a predetermined amount of water is added to filler 6, mixed and agitated, and then filled in opening portion 13. A specific hydrating agent is sometimes used in accordance with the type of filler 6.

Generally, filler 6 must be thicker than floor 4. Especially when cables are to be inserted in opening portion 13, the thickness of filler 6 must be 200 to 300 mm because cables are good heat conductors.

However, the following problems are posed when filler 6 is constructed in a channel portion.

(1) A mixing ratio between water and filler 6 must be correctly set as determined.

(2) A long time period is required for curing filler 6.

(3) In particular, about a month is required for curing filler 6 in a cable channel portion. If cables move or vibrate in this period, a gap is formed between filler 6 and the cables. Therefore, a good fire/smoke protection structure cannot be obtained.

(4) After the number of pipes 5' or cables 5 is increased, filler 6 must be refilled. In this case, problems (1) to (3) are posed again.

SUMMARY OF THE INVENTION

It is an object of the present invention to provide a perfect and reliable fire/smoke protection structure for a plastic pipe or cable channel portion in a floor or wall, which can be easily constructed at a construction site, which has good workability during construction, and which can be easily maintained and reconstructed after construction.

The present invention is a fire/smoke protection structure for a plastic pipe or cable channel portion in a floor or wall, wherein thermal expansion composite molded members each molded into a desired shape are densely filled to form a filled layer in a gap defined between the inner surface of a floor or wall at the plastic pipe or cable channel portion in a floor or wall and the outer surface of a plastic pipe or cable.

In the fire/smoke protection structure for a cable channel portion in a floor or wall according to the present invention, the thermal expansion composite molded members each molded into a desired shape are simply inserted and filled in the gap defined between the outer surface of the cable and the floor or wall. Therefore, reconstruction for increasing the number of cables or the like can be easily performed by simply extracting the filled thermal expansion composite molded members.

In the present invention, the thermal expansion composite molded member molded into a desired shape includes, e.g., a member obtained by coating a nonrefractory material on the outer surface of a molded columnar core consisting of a fire retardant resin foaming body such as a silicone rubber foaming body or polyurethane foaming body compressed to 90% or less of a normal volume and molding the resultant material into a desired shape, and a member obtained by coating a thermally foaming fire retardant resin composition on the outer surface of a core consisting of a refractory material and molded into a desired shape such as a column, a square pillar, or a sphere.

When the former thermal expansion composite molded member is heated by a fire or the like, the non-refractory material coated on the outer surface of the core is burned or loses its retaining function, and therefore the fire retardant resin foaming body compressed to 90% or less of the normal volume expands and recovers the normal volume. When the latter one is heated by a fire or the like, the thermally foaming fire retardant resin composition layer coated on the outer surface of the core of the desired shape consisting of the refractory material foams to be a foaming body. That is, either of the above composite molded members expands to completely close and seal the gap between the cable channel portion and the floor or wall, thereby protecting an adjacent area defined by the floor or wall against the fire or smoke flowing through the channel portion.

In the present invention, the fire retardant resin foaming body serving as the core of the former thermal expansion resin composite molded member may be compressed to 90% or less of the normal volume by any desired means such as a mechanical one.

If a compression ratio is too small, no good result can be achieved because expansion obtained by a fire becomes small. Therefore, the compression ratio is set to be 90% or less, and preferably, 70 to 80% of a normal volume. The non-refractory material to be coated on the outer surface of the core consisting of the compressed foaming body may be any material such as a plastic film or paper as long as it has physical strength sufficient to hold the shape of the core compressed at room temperature and a function of recovering the normal volume of the foaming body of the core at a high temperature of 80° C. or more.

An example of the refractory material of the core of the latter thermal expansion composite molded member is a molded body of a desired shape consisting of, e.g., calcium silicate, mortar, gypsum, ceramic, or diatomaceous earth. An example of the thermally foaming resin composition to be coated on the outer surface of the core mainly consists of a filler and a swelling agent and forms a refractory foaming heat insulating layer when it is brought into contact with a flame or at a high temperature of 250° C. or more. More specifically, the composition is based on a material consisting of the following amounts (with respect to a total amount) of four components, i.e., 5 to 70 wt % of a carbon source, 5 to 70 wt % of a catalyst, 5 to 70 wt % of a foaming agent, and 1 to 80 wt % of a spherical or almost spherical filler. The carbon source is a substance which can give a carbon structure to the heat insulating foaming body, and includes a large number of groups capable of being exterificated together with boric acid or phosphoric acid, especially hydroxyl groups, and a large number of carbon atoms. Examples of the carbon source are carbohydrate, polyhydroxy alcohol, and phormorsepentaacetate. The catalyst is ammonium orthophosphate which is decomposed at a decomposition point or less of the carbon source and produces a largest amount of boric acid or phosphoric acid. The foaming agent is a substance which produces a non-combustible gas. Examples of the foaming agent is guanylic urea, dicyandiamide, melamine, and urea. The filler preferably consists of inorganic hollow beads. Such a composition is a putty-like substance and commercially available as FOMOX (tradename) from BAYER CO., West Germany. In addition, a thermally foaming composition obtained by mixing a ceramic fiber and vermiculite can be used.

BRIEF DESCRIPTION OF THE DRAWINGS

FIG. 11 is a sectional view showing still another embodiment of the present invention adopting a thermal expansion composite molded member using a spherical refractory material core;

FIG. 12 is a schematic view for explaining a structure of the spherical thermal expansion composite molded member used in the embodiment of FIG. 11;

FIG. 13 is a sectional view showing the thermal expansion composite molded member shown in FIG. 12 taken along line C—C thereof;

FIG. 14 is a schematic view for explaining a thermal expansion composite molded member using a cubic refractory material core; and FIG. 15 is a sectional view showing the thermal expansion composite molded member shown in FIG. 14 taken along line D—D thereof.

DETAILED DESCRIPTION OF THE PREFERRED EMBODIMENTS

Embodiments of the present invention will be described below with reference to the accompanying drawings.

Figure 1:
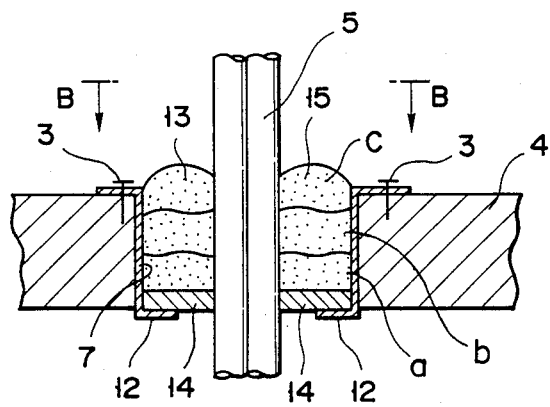
FIG. 1 is a sectional view showing a conventional fire/smoke protection structure for a cable channel portion in a floor.
Figure 2:
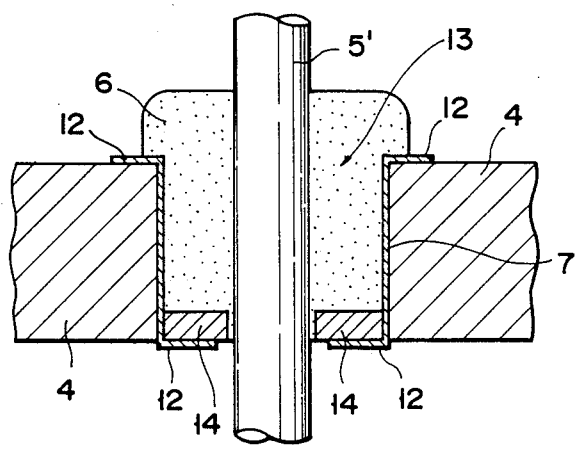
FIG. 2 is a sectional view showing a conventional fire/smoke protection structure for a pipe channel portion in a floor.
Figure 3:
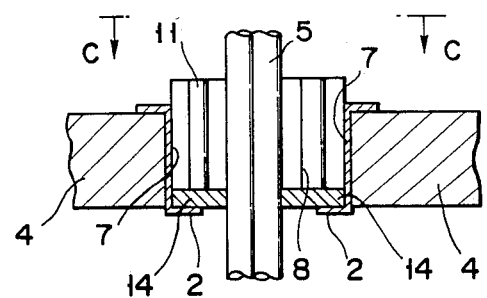
FIG. 3 is a sectional view showing a fire/smoke protection structure for a plastic pipe or cable channel portion in a floor or wall according to an embodiment of the present invention.
Figure 4:
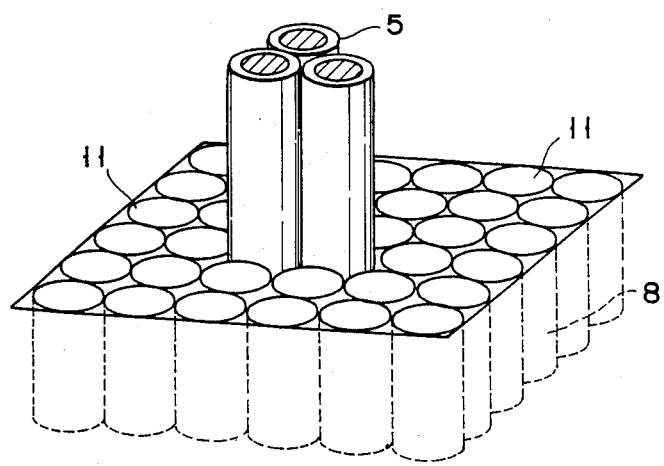
FIG. 4 is a perspective view showing a main part of the embodiment shown in FIG. 3 viewed from a direction of line C—C.

FIG. 3 is a sectional view showing a fire/smoke protection structure for a cable channel portion in a floor or wall according to an embodiment of the present invention. FIG. 4 is a perspective view showing a main part of the fire/smoke protection structure shown in FIG. 3 viewed from a direction of line C—C. Note that the same reference numerals as in the conventional fire/smoke protection structure of FIG. 1 denote the same parts in FIGS. 3 and 4.

In this fire/smoke protection structure, a large number of thermal expansion composite molded members 11 are densely filled in gap portion 8 formed between the outer surfaces of cables 5 and frame member 2 mounted on the inner surface of channel portion 7.

Figures 5A, 5B:
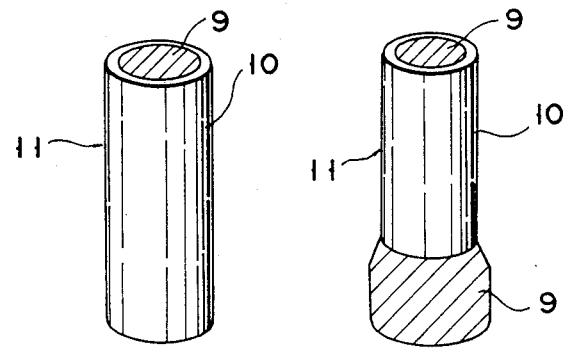
FIG. 5A is a perspective view showing an embodiment of a thermal expansion composite molded member.
FIG. 5B is a perspective view in which a core of the thermal expansion composite molded member shown in FIG. 5A recovers its normal volume.

As shown in FIG. 5A, the shape of each composite molded member 11 is a column. Composite molded member 11 is obtained by coating non-refractory material layer 10 on the outer surface of core 9 consisting of a fire retardant foaming body which is compressed to 90% or less of its normal volume.

Layer 10 is formed of, e.g., a plastic film or paper. Core 9 is formed of, e.g., a silicone rubber foaming body having a closed-cell rate of 50% or more.

In FIG. 3, reference numeral 14 denotes a refractory plate consisting of a calcium silicate plate, a ceramic board, or the like.

According to the fire/smoke protection structure for a cable channel portion in a floor or wall having the above arrangement, if a fire occurs, hot air flows into gaps defined between composite bodies 11. When the hot air reaches a certain temperature or more, layer 10 loses its shape maintaining function. Therefore, core 9 recovers its normal volume as shown in FIG. 5B. As a result, the gaps between composite bodies 11 are completely closed. Therefore, channel portion 7 does not pass smoke and the hot air to a side opposite to a site of the fire to achieve a smoke protection function and protects cables 5 against the fire.

If layer 10 is formed of a polyethylene film, core 9 loses its shape maintaining function at about 90° C. If layer 10 is formed of paper, core 9 loses the above function at about 150° C.

If core 9 is formed of a silicone rubber foaming body, it normally has 50% or more of closed cells. For this reason, the volume expansion effect is further promoted as a temperature increases.

In this embodiment, the conventional foaming body need not be filled in channel portion 7 at a construction site. Therefore, a problem of mixing variation or the like upon filling of raw material of the foaming body is not posed. In addition, the construction site is not contaminated. Moreover, cables 5 or the like can be easily and reliably increased in number or removed.

Figure 6:
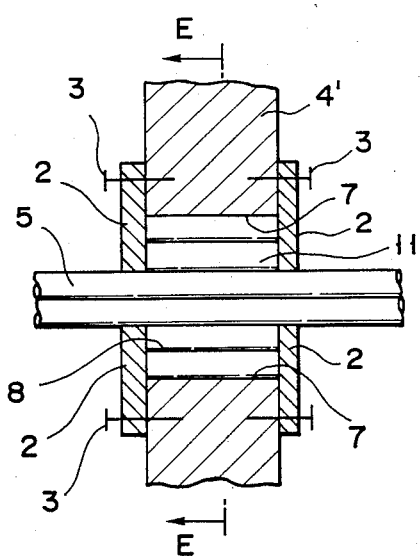
FIG. 6 is a sectional view showing a channel portion in a wall according to another embodiment of the present invention.
Figure 7:
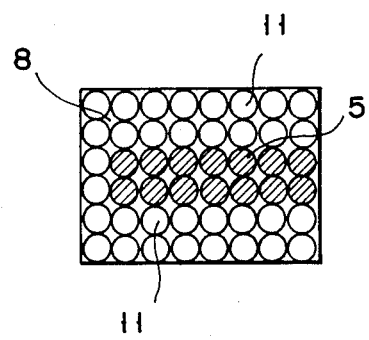
FIG. 7 is a sectional view taken along line E—E of FIG. 6.

Note that as shown in FIGS. 6 and 7, this embodiment can be applied to a case wherein cables 5 are inserted in channel portion 7 formed in wall 4'.

Figure 8:
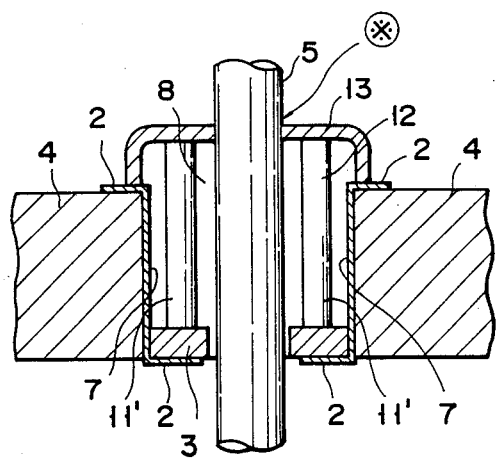
FIG. 8 is a sectional view showing still another embodiment of the present invention.

FIG. 8 is a sectional view showing another embodiment of the present invention. Note that in FIG. 8, the same reference numerals as in FIG. 3 denote the same parts.

In this fire/smoke protection structure, a large number of thermal expansion composite molded members using a refractory material core adopted 11' are filled in gap portion 8 formed between the outer surfaces of cables 5 and frame member 2 mounted on the inner surface of channel portion 7, thereby constituting filled layer 12.

Figure 9:
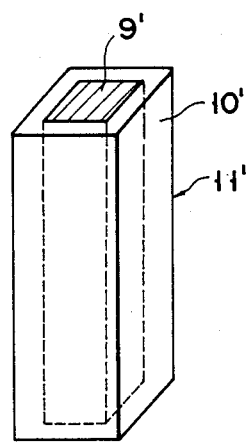
FIG. 9 is a perspective view showing a thermal expansion composite molded member of a square pillar shape using a refractory material core adopted in the embodiment of FIG. 8.
Figure 10:
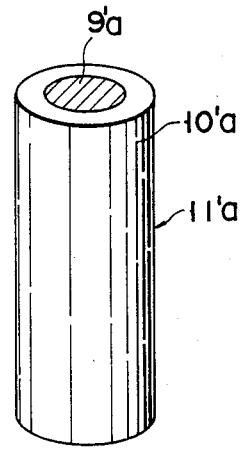
FIG. 10 is a perspective view showing a columnar thermal expansion composite molded member using a columnar refractory material core.

The shape of each thermal expansion composite molded member 11' is, e.g., a rod as shown in FIG. 9. Alternatively, columnar refractory composite molded member 11'a as shown in FIG. 10, substantially spherical refractory composite molded member 11'b and 11'c as shown in FIGS. 12 and 13, or cubic refractory composite molded member 11'd as shown in FIGS. 14 and 15 may be adopted.

Composite molded member 11' to 11'd are obtained by forming surface layers 10' to 10'd consisting of a thermally foaming composition on the surfaces of refractory cores 9' to 9'd, respectively.

Fire retardant or non-combustible coating material layer 13 is formed to cover filled layer 12 and to close channel portion 7.

In this embodiment, core 9' is a square pillar of 40 mm side consisting of calcium silicate. Surface layer 10' is formed by coating, e.g., FOMOX (tradename) available from BAYER CO., West Germany on the surface of core 9' to a thickness of 5 mm. Alternatively, surface layers 10' and 10'c may be coated on square pillar core 9' of 25 mm side or spherical core 9'c having a diameter of 25 mm to a thickness of 3 mm.

Thermal expansion composite molded member 11' was filled as follows. That is, after refractory plate 3 serving as a bottom plate was inserted, square refractory composite molded member 11' of 50 mm side or refractory composite molded member 11'c having a diameter of 50 mm were filled in channel portion 7. Square refractory composite molded member 11' of 35 mm side or refractory composite molded member 11'c having a diameter of 35 mm were filled in small gaps to a substantially full filling amount. The length of pillars used in this structure was 250 mm.

3×60-mm² CV power cables were used as cables 5. In accordance with a standard fire curve of JIS A 1304, a portion below the floor was heated, and the temperature of a predetermined portion (indicated by symbol in FIG. 8) at a side opposite to a fire was measured during heating and two hours after heating was started (highest temperature=1,010° C.).

After heating was started, smoke slightly flowed through gaps between composite molded member 11' and 11'c for 3 to 5 minutes. However, an amount of smoke was gradually reduced to be finally zero after 15 minutes.

A highest temperature at the side opposite to the fire measured two hours after heating was started was 295° C. which did not reach a flash temperature of a cable coating material (polyethylene=341° C.). That is, the structure of the present invention was found to be satisfactory as a fire/smoke partition channel portion protection structure for a cable.

Coating material layer 13 is not particularly limited to those described above as long as it is fire retardant or refractory; it can be such as fire retardant putty-like DANSEAL (tradename) available from Furukawa Electric Co., Ltd., mortar, FOMOX (tradename) used in the present invention, or a thermally foaming non-combustible material.

Although layer 13 can be dispensed with, its use is desirable for two reasons. First, it can perfectly prevent the passage of smoke in the initial phase of fire. Secondly, it helps to improve the outer appearance of the channel portion protection structure.

In addition, another embodiment of the present invention which adopts a substantially spherical refractory composite molded member as shown in FIG. 11 may be employed.

What is claimed is:

1. A fire/smoke protection structure for filling a gap between an outer surface of a plastic pipe or cable channel portion and a floor or wall, comprising:
   a plurality of thermal expansion composite molded members each molded into a desired shape;
   said thermal expansion composite molded members being densely filled to form a filled layer in said gap defined between an inner surface of the floor or wall and said outer surface of said plastic pipe or cable channel portion, and said composite molded members being selectively removable from said gap; and
   each of said filled expansion composite molded members in said gap comprising a core of a predetermined shape formed of a fire retardant resin foamimg body compressed to not more than 90% of a normal volume thereof, and a non-refractory material coated on the outer surface of said core.

2. The structure of claim 1, wherein each of said thermal expansion composite molded members in said gap is in the shape of a column.

3. The structure of claim 1, wherein each of said thermal expansion composite molded members in said gap is in the shape of a substantially square pillar.

4. The structure of claim 1, wherein each of said thermal expansion composite molded members in said gap is in the shape of a substantially rectangular square pillar.

5. The structure of claim 1, wherein each of said thermal expansion composite molded members in said gap is in the shape of a sphere.

6. A fire/smoke protection structure for filling a gap between an outer surface of a plastic pipe or cable channel portion and a floor or wall, comprising:
   a plurality of thermal expansion composite molded members each molded into a desired shape;
   said thermal expansion composite molded members being densely filled to form a filled layer in said gap defined between an inner surface of the floor or wall and said outer surface of said plastic pipe or cable channel portion, and said composite molded members being selectively removable from said gap; and
   each of said filled expansion composite molded members in said gap comprising a core of a predetermined shape formed of a refractory material, and a coating on said refractory material core, said coating being a thermally foaming fire retardant composition coated on the outer surface of said core.

7. The structure of claim 6, wherein each of said thermal expansion composite molded members in said gap is in the shape of a column.

8. The structure of claim 6, wherein each of said thermal expansion composite molded members in said gap is in the shape of a substantially square pillar.

9. The structure of claim 6, wherein each of said thermal expansion composite molded members in said gap is in the shape of a substantially rectangular square pillar.

10. The structure of claim 6, wherein each of said thermal expansion composite molded members in said gap is in the shape of a sphere.

* * * * *